(12) United States Patent
Stieger

(10) Patent No.: US 8,953,935 B2
(45) Date of Patent: Feb. 10, 2015

(54) ILLUMINATION ARRANGEMENT FOR AN IMAGE FIELD DELIMITATION FRAME OF A MIXED-IMAGE VIEWFINDER CAMERA

(71) Applicant: Leica Camera AG, D-35606 Solms (DE)

(72) Inventor: Horst Stieger, Solms (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 13/755,209

(22) Filed: Jan. 31, 2013

(65) Prior Publication Data

US 2013/0243414 A1 Sep. 19, 2013

(30) Foreign Application Priority Data

Feb. 1, 2012 (DE) .......................... 10 2012 001 853

(51) Int. Cl.
| | | |
|---|---|---|
| G03B 13/10 | (2006.01) | |
| G03B 13/02 | (2006.01) | |
| H04N 5/222 | (2006.01) | |
| H04N 5/225 | (2006.01) | |
| G03B 13/06 | (2006.01) | |

(52) U.S. Cl.
CPC ................ G03B 13/10 (2013.01); G03B 13/02 (2013.01); G03B 13/06 (2013.01)
USPC ...... 396/378; 396/374; 348/333.09; 348/341; 359/707

(58) Field of Classification Search
USPC ........... 396/373, 374, 377–380, 383–386, 84, 396/141, 148, 271, 296; 348/333.09, 341; 359/643
See application file for complete search history.

(56) References Cited

U.S. PATENT DOCUMENTS

| | | | |
|---|---|---|---|
| 5,361,119 A | 11/1994 | Shida et al. | |
| 5,754,900 A | 5/1998 | Suda | |
| 6,292,629 B1 * | 9/2001 | Sensui | ........................ 396/147 |
| 6,449,439 B1 | 9/2002 | Boyd et al. | |
| 6,677,936 B2 * | 1/2004 | Jacobsen et al. | .............. 345/211 |

FOREIGN PATENT DOCUMENTS

| | | |
|---|---|---|
| DE | 40 01 056 A1 | 7/1991 |
| DE | 199 12 117 A1 | 9/1999 |
| DE | 199 62 712 A1 | 6/2000 |

OTHER PUBLICATIONS

European Search Report, Jun. 10, 2013, 6 pages.

* cited by examiner

*Primary Examiner* — Rochelle-Ann J Blackman
(74) *Attorney, Agent, or Firm* — Foley & Lardner LLP

(57) ABSTRACT

In an illumination arrangement (1) for an image field delimiting frame (2) of a mixed-image viewfinder camera having an observation beam path (9) and a viewfinder beam path (3), the illumination arrangement is arranged in the viewfinder beam path (3) in the direction of light upstream of the image field delimiting frame (2), the illumination is formed by an active light source (14, 14') and the viewfinder beam path (3) is mechanically delimited (16, 22) within the illumination apparatus (1) with respect to the light source (14, 14').

15 Claims, 3 Drawing Sheets

PRIOR ART

Figure 1:
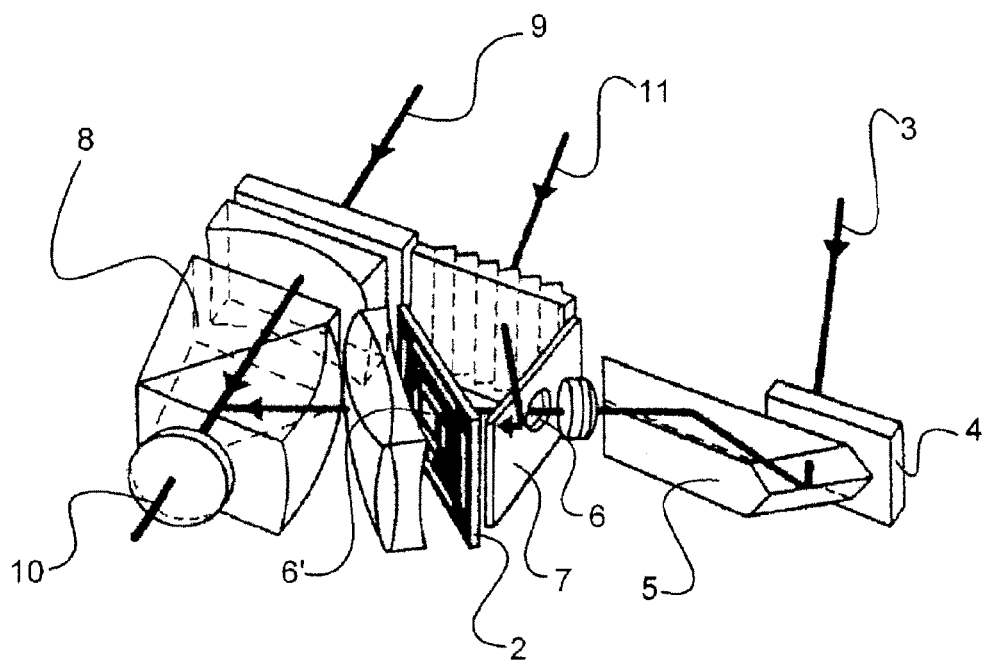

ILLUMINATION ARRANGEMENT FOR AN IMAGE FIELD DELIMITATION FRAME OF A MIXED-IMAGE VIEWFINDER CAMERA

The invention relates to an illumination arrangement.

In known mixed-image viewfinder cameras, an image field delimiting frame is inserted into the viewfinder beam path, which image field delimiting frame is imaged into the plane of the mixed image of the viewfinder. The viewfinder beam path is guided through a central opening in the image field delimiting frame. The image field frame is passively illuminated via a separate window in the camera housing by way of ambient light. In the case of bright ambient light, this results in blooming in the imaging of the image field delimiting frame, and in the case of darker ambient light results in a contrast reduction in the imaging of the image field delimiting frame and thus in problems during focusing in the mixed image of the viewfinder.

The image field delimiting frames should be matched in cameras with interchangeable objectives to the focal length of the objective used. To this end, interchangeable image field delimiting frames or image controlled manner can be provided. The mechanical complexity required for this is considerable.

The viewfinder beam path can be arranged together with the image field delimiting frames in the mixed-image viewfinder such that it is displaceable transversely to the viewfinder beam path in order to compensate for parallaxes between the observation image and the viewfinder image produced by the image field delimiting frames. In order to illustrate the focusing state, the viewfinder beam path in the object focusing is configured such that it is pivotable. In the case of the correct focal position, the images of the viewfinder beam path and of the observation beam path which are superposed in the viewfinder prism coincide.

A further known mixed-image viewfinder cameras is that stray light is superposed on the viewfinder beam path under any illumination conditions. This negative effect can be seen, when both the observation beam path and the viewfinder beam path are obscured, as a bright rectangular spot in the mixed-image beam path. In the case of such obscuring of both the observation beam path and the viewfinder beam path, ideally only the image field delimiting frames which are illuminated by the illumination arrangement via a window and a mirror should be visible in the viewfinder prism. In fact, stray light is disadvantageously fed through the conventional illumination arrangement via the mirror to the central opening, which is intended only for guiding the viewfinder beam path. Depending on the illumination situation and viewing angle of the user into the viewfinder, during normal use this results in an undesirably low-contrast and weak imaging of the viewfinder beam path during superposition with the image of the observation beam path in the viewfinder prism.

It was therefore the object of the invention to specify an illumination arrangement with which a uniform high-contrast representation of the image field delimiting frames is possible even with changing ambient light conditions superposition stray light on the viewfinder beam path is avoided.

This object is achieved in an illumination arrangement according to the embodiments described herein.

In an illumination arrangement according to the invention for an image field delimiting frame of a mixed-image viewfinder camera having an observation beam path and a viewfinder beam path, the illumination arrangement is arranged in the viewfinder beam path in the direction of light upstream of the image field delimiting frame. In this manner, uniform background illumination of the image field delimiting frames in transmitted-light mode is possible without stray light in the region of the viewfinder prism. A high-contrast representation of the image field delimiting frames during projection in the viewfinder prism and superposition in the mixed-image beam path is ensured. The illumination is advantageously formed by an active light source and is thus independent in this manner of the brightness of the ambient light. The viewfinder beam path is mechanically delimited within the illumination apparatus with respect to the light source, and in this manner no light from the active light source reaches the viewfinder beam path and is thus also not superposed in a disturbing manner onto said viewfinder beam path. In the mixed image of the viewfinder, this can be seen in that, if the window of the viewfinder beam path and of the observation beam path is covered, no diffuse field can be seen at the site of the mixed-image production in the viewfinder prism in the mixed-image beam path.

In an advantageous development of the illumination arrangement, the viewfinder beam path is surrounded in the region of the illumination arrangement by an opaque tube, which ensures a reliable mechanical delimitation of the light source with respect to the viewfinder beam path.

In a development of the illumination arrangement according to the invention, the viewfinder beam path is pivotable within the mixed-image viewfinder arrangement with respect to the observation beam path and the tube is configured in the shape of a funnel. In this manner it is ensured that, when the viewfinder beam path is pivoted, no undesired shading of the image edges of the viewfinder beam path occurs. This effect is supported additionally in an advantageous manner by the light entry side of the funnel being assigned the large opening of the funnel, and by the diameter of the large opening being matched to the pivoting region of the optical axis of the viewfinder beam path during focus setting. In this manner it is ensured that the installation space in the interior region of the illumination arrangement is not unnecessarily restricted and sufficient light reaches even the smallest mask frames in closest proximity to the through-passage for the viewfinder beam path.

In a particularly advantageous manner, in the case of an illumination arrangement according to the invention, the light source comprises a plurality of LEDs arranged around the funnel-shaped tube, wherein a light diffuser is arranged between the LEDs and the image field delimiting frames. In this manner, uniform illumination of the image field delimiting frames is ensured. In a particularly advantageous and at the same time easy-to-use configuration of the light diffuser, a diffusing film has proven useful. In particular a polyester film which is arranged in a plurality of layers, preferably configured in three layers, one on top of the other achieves the desired uniform diffusion effect.

In a further embodiment of the illumination arrangement, a cylindrical end part is formed integrally on the funnel side having the small opening, which end part projects as closely as possible to the plane of the image field delimiting frames so as to exclude superposition of stray light in the region of the through-passage for the viewfinder beam path. The diffusing film is pushed onto the cylindrical end part by way of a central opening which is matched to the geometry of said end part, wherein the length of the end part determines a distance of the diffusing film from the image field delimiting frame. In a particularly advantageous manner, a spacer function is thus achieved and a defined distance of the diffusing film with respect to the plane of the image field delimiting frames is maintained. The image field delimiting frames are located in an intermediate image plane of the optics of the mixed-image viewfinder, so that they are imaged perceivably and sharply in a superposed manner into the mixed-image beam path in the viewfinder prism. In an arrangement where the diffusing film has insufficient distance from the image field delimiting frames, the structure of the surface of the diffusing film would likewise be perceivably superposed on the mixed-image beam path in the viewfinder prism, which is undesired.

In a further configuration of the invention, for illumination purposes LEDs having different color characteristics are provided. In this manner, the appearance of the image field delimiting frames can be matched individually to the photographer's wishes and requirements. For optimum automatic matching, the LEDs are electronically controllable in terms of color and brightness. Thus it is possible on the one hand for the user to preselect and set, for example by way of a menu point of the camera, a desired color and brightness, but also on the other hand for automatic adaptation to fluctuating ambient light and brightness conditions to be effected. A representation of the image field delimiting frames which is always optimum is thus ensured.

In a particularly advantageous manner, the illumination device is configured as a closed box, into which the tube for the through-passage of the viewfinder beam path is inserted centrally. In this manner, simple installation of the illumination arrangement is ensured and, owing to an opaque configuration of the box, any disturbing stray light inside the mixed-image viewfinder arrangement is ruled out.

In a further embodiment of the invention, the automatic control of the brightness of the light source can be regulated in dependence on the ambient brightness in a proportional fashion between a predetermined minimum value and a maximum value. To produce two colors in the illumination light, for example four LEDs of one color can be arranged symmetrically around the funnel-shaped tube, and a further four of another color can be arranged in each case between the LEDs of the first color. If LEDs of various colors are provided, there are practically no limits in terms of the selection of the individual color configuration by the user.

The invention is illustrated schematically in the drawing and will be described in more detail in the figures with reference to an exemplary embodiment.

Figure 2:
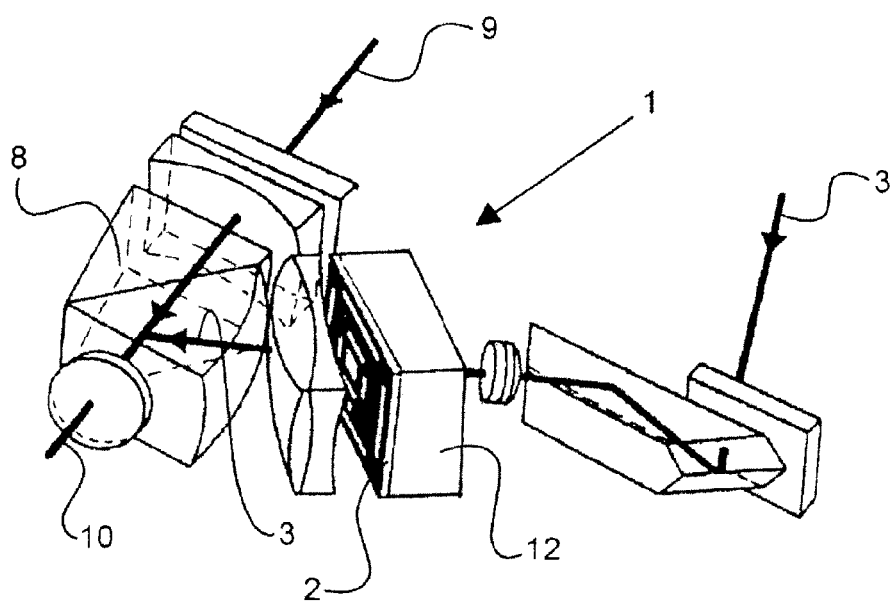
Figure 3:
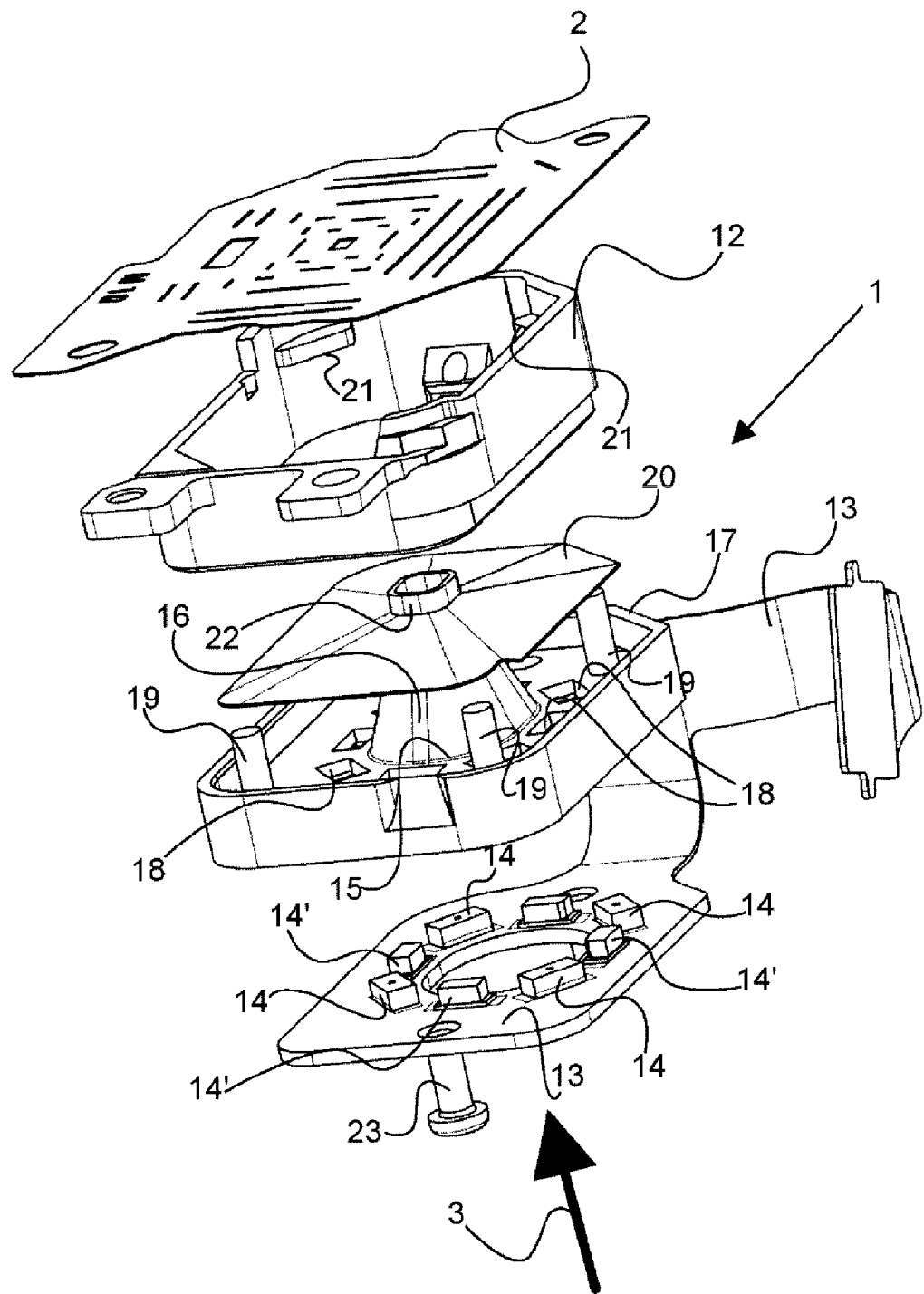
Figure 4:
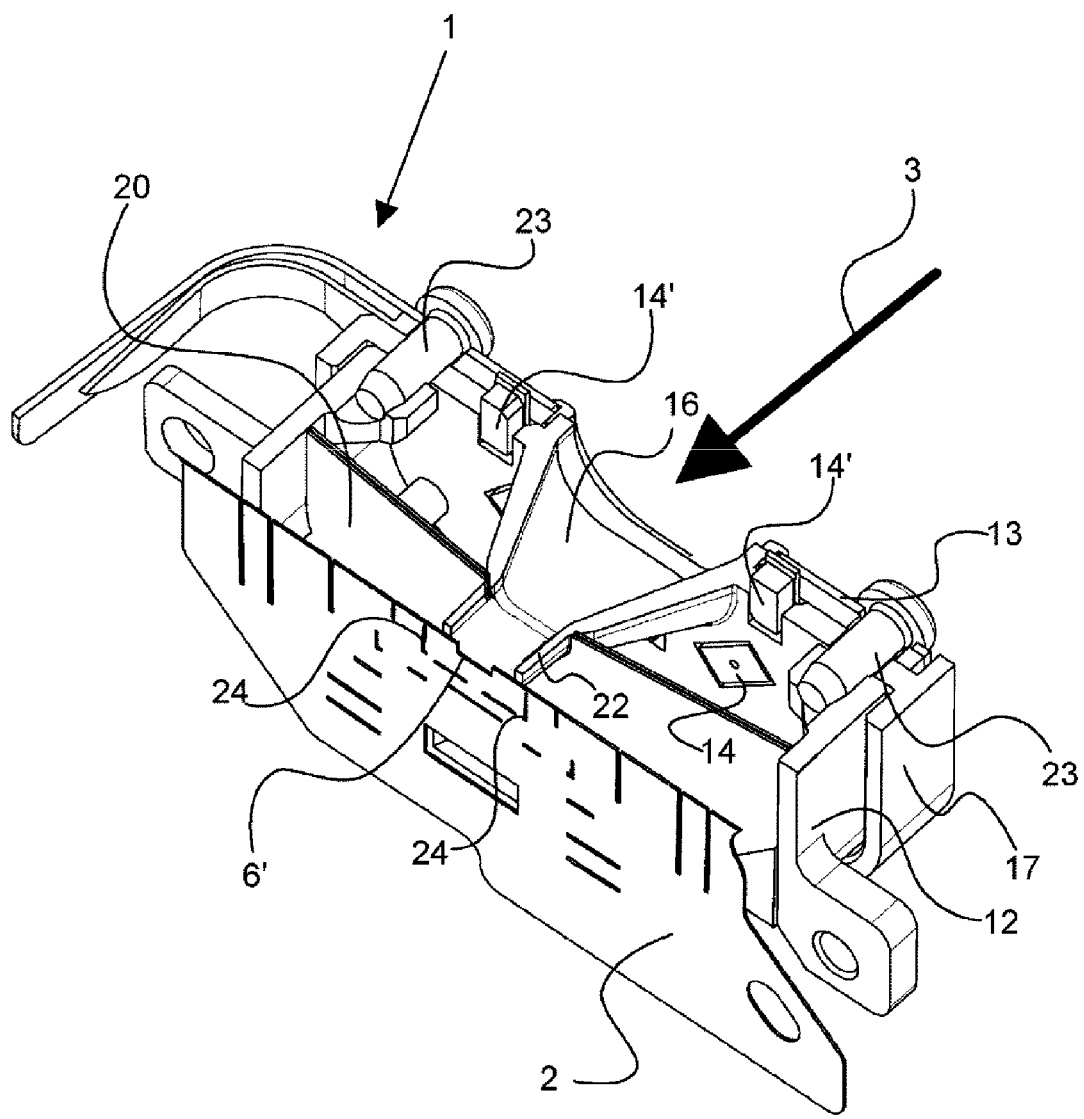

FIG. 1 shows an illumination arrangement for image field delimiting frames of a mixed-image viewfinder camera according to the prior art, FIG. 2 shows a schematic illustration of an illumination arrangement according to the invention in the viewfinder beam path of a mixed-image viewfinder camera, FIG. 3 shows an exploded illustration of the illumination arrangement having image field delimiting frames, FIG. 4 shows a sectional illustration of an assembled illumination arrangement.

FIG. 1 illustrates an illumination arrangement for image field delimiting frames 2 of a mixed-image viewfinder camera (which is not illustrated further) according to the prior art. Here, a viewfinder beam path 3 enters the mixed-image viewfinder through a window 4 and is guided, using a deflection and erecting prism 5, through a light entry opening 6 in a mirror 7 and a further light entry opening 6' in the image field delimiting frame 2 to a viewfinder prism 8. In the viewfinder prism 8, the viewfinder beam path 3 is superposed on an observation beam path 9 to form a mixed-image beam path 10. The image field delimiting frames 2 are illuminated by entry of ambient light 11 through a prism array onto a mirror 7, which deflects it further in the direction of the image field delimiting frames 2.

FIG. 2 shows an illustration of an illumination arrangement 1 according to the invention in the viewfinder beam path 3 of a mixed-image viewfinder camera (not illustrated further).

The illumination arrangement 1 is arranged schematically as a box 12 in the viewfinder beam path 3 in the direction of light upstream of the image field delimiting frame 2. As illustrated also in FIG. 1, the viewfinder beam path 3 is superposed on the observation beam path 9 in the viewfinder prism 8 to form a mixed-image beam path 10.

FIG. 3 illustrates an exploded illustration of the illumination arrangement 1 having an image field delimiting frame 2, which has a plurality of slits for forming luminous frames of various sizes and further mechanical ruptures for entry of light. The viewfinder beam path 3 is schematically formed by an arrow. LEDs 14 of a first luminous color are arranged on an LED conductor strip 13, and LEDs 14' of a second luminous color are arranged symmetrically around an opening, which is matched to the large opening 15 of a funnel 16. The LED conductor strip 13 is preferably configured to be opaque and is placed on an LED holder frame 17 having LED openings 18. A particularly secure connection of the LED conductor strip 13 through the LED holder frame 17 to the box 12 is achieved using a screw connection 23. The LED openings 18 in the LED holder frame 17 secure the alignment of the LEDs 14, 14' and screen against stray light. The LED holder frame 17 furthermore has in its corners four symmetrically arranged clamping pins 19 which fix a diffusing film 20 against four corresponding film support surfaces 21 which are integrally formed in the box 12. A cylindrical end part 22 which is integrally formed on the funnel 16 forms an internal rotation-symmetrical support on the funnel 16 for the diffusing film 20. The cylindrical end part 22 preferably has a length of ca. 1 mm.

The sectional illustration of an assembled illumination arrangement 1 illustrated in FIG. 4 shows the screw connection 23 of the LED conductor strip 13 to the LED holder frame 17 and the box 12. The image field delimiting frame 2 having a light entry opening 6' for the viewfinder beam path 3 is arranged in the direction of light upstream of the funnel 16, with cylindrical end part 22, which funnel is integrally formed on the LED holder frame 17. The diffusing film 20 is clearly spaced apart from the image field delimiting frame 2 and is located on the cone-shaped edge of the funnel 16, centered by the cylindrical end part 22. The light from the LEDs 14, 14 can thus pass in an unobstructed manner to the illumination slits 24 for the smallest mask presentation, without entering the light entry opening 6' for the viewfinder beam path 3.

LIST OF REFERENCE SIGNS 1 illumination arrangement
2 image field delimiting frame
3 viewfinder beam path
4 window
5 erecting prism
6 light entry opening
7 mirror
8 viewfinder prism
9 observation beam path
10 mixed-image viewfinder beam path
11 ambient light
12 box
13 LED conductor strip
14, 14' LEDs
15 large opening of the funnel
16 funnel
17 LED holder frame
18 LED openings
19 clamping pins

20 diffusing film
21 film support surfaces
22 cylindrical end part
23 screw connections
24 illumination slits

The invention claimed is:

1. An illumination arrangement for an image field delimiting frame of a mixed-image viewfinder camera comprising:
   an observation beam path; and
   a viewfinder beam path, wherein
   a) the illumination arrangement is arranged in the viewfinder beam path in a direction of light upstream of the image field delimiting frame,
   b) an illumination is formed by an active light source, and
   c) the viewfinder beam path is surrounded by an opaque tube thereby mechanically delimiting the viewfinder beam path within the illumination arrangement with respect to the light source such that no light from the illumination formed by the light source reaches the viewfinder beam path.

2. The illumination arrangement according to claim 1, wherein the viewfinder beam path is pivotable with respect to the observation beam path and the opaque tube is configured in a shape of a funnel.

3. The illumination arrangement according to claim 2, wherein the funnel has a large opening and a small opening, a light entry side of the funnel is a same side as the large opening of the funnel, and a diameter of the large opening is matched to a pivoting region of an optical axis of the viewfinder beam path during focus setting.

4. The illumination arrangement according to claim 3, wherein a cylindrical end part is formed integrally on the funnel side having the small opening, and a diffusing film is pushed onto the end part, wherein a length of the end part determines a distance of the diffusing film from the image field delimiting frame.

5. The illumination arrangement according to claim 1, wherein the light source comprises a plurality of LEDs arranged around a funnel-shaped tube.

6. The illumination arrangement according to claim 5, wherein a light diffuser is arranged between the LEDs and the image field delimiting frame.

7. The illumination arrangement according to claim 6, wherein the light diffuser comprises a diffusing film.

8. The illumination arrangement according to claim 5, wherein the LEDs have different color characteristics.

9. The illumination arrangement according to claim 5, wherein a color and a brightness of the LEDs are electronically controllable.

10. The illumination arrangement according to claim 1, wherein the illumination arrangement is configured as a closed box, into which a tube for a through-passage of the viewfinder beam path is inserted centrally.

11. An illumination arrangement for an image field delimiting frame of a mixed-image viewfinder camera comprising:
    an observation beam path; and
    a viewfinder beam path, wherein
    a) the illumination arrangement is arranged in the viewfinder beam path in a direction of light upstream of the image field delimiting frame,
    b) an illumination is formed by an active light source comprising a plurality of LEDs arranged around a funnel-shaped tube, and
    c) the viewfinder beam path is mechanically delimited within the illumination arrangement with respect to the light source.

12. The illumination arrangement according to claim 11, wherein a light diffuser is arranged between the LEDs and the image field delimiting frame.

13. The illumination arrangement according to claim 12, wherein the light diffuser comprises a diffusing film.

14. The illumination arrangement according to claim 11, wherein the LEDs have different color characteristics.

15. The illumination arrangement according to claim 11, wherein a color and a brightness of the LEDs are electronically controllable.

* * * * *